April 24, 1956     J. G. STREIFFERT     2,742,837
ILLUMINATING SYSTEM FOR COLOR MOTION-PICTURE PRINTER
Filed Oct. 18, 1954     2 Sheets-Sheet 1

John G. Streiffert
INVENTOR.

BY
ATTORNEYS

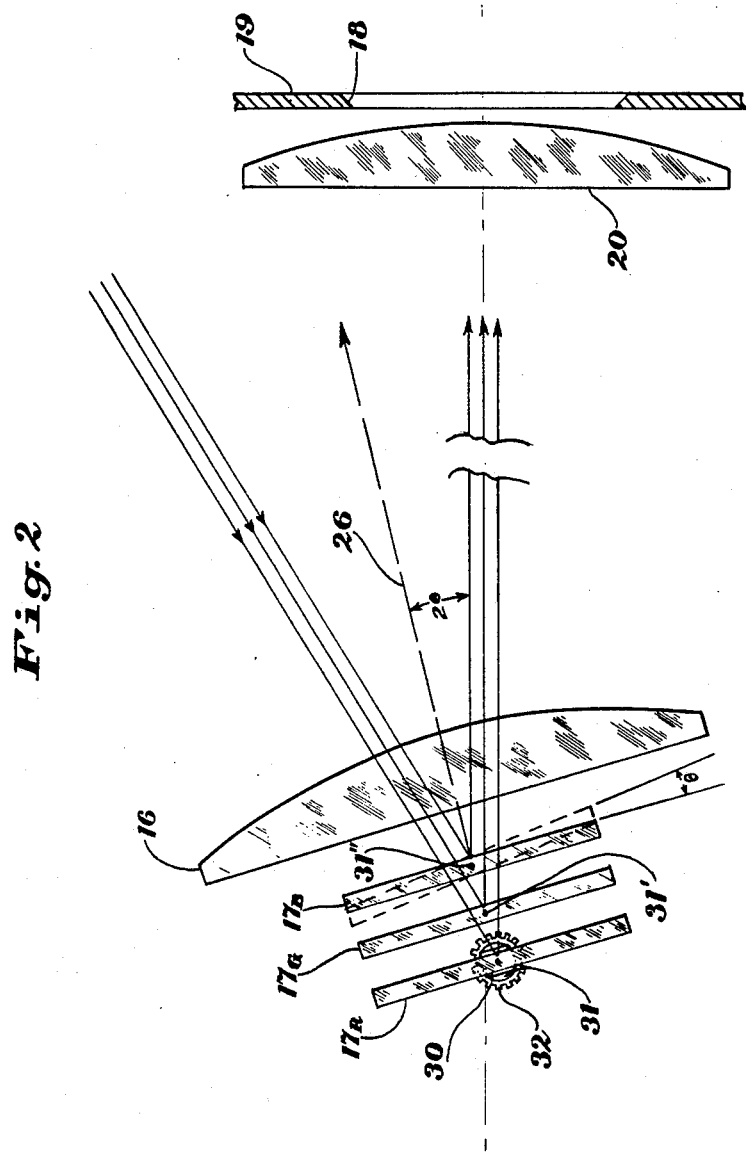

United States Patent Office 2,742,837
Patented Apr. 24, 1956

2,742,837

ILLUMINATING SYSTEM FOR COLOR MOTION-PICTURE PRINTER

John G. Streiffert, Rochester, N. Y., assignor to Eastman Kodak Company, Rochester, N. Y., a corporation of New Jersey Application October 18, 1954, Serial No. 462,699

4 Claims. (Cl. 95—75)

The present invention relates to an improved illuminating system for motion-picture printers and which is adapted to provide controlled additive trichromatic illumination when using a single lamp.

An illumination system in a continuous contact printer used for making motion-picture color prints must fulfill many requirements. The more difficult requirements to attain are: (1) sufficient illumination to expose the color positive material at a printing speed of at least 100 frames per minute, and (2) provision for control of exposure and/or color balance to compensate for scene-to-scene variations in negative density and color balance and for emulsion-to-emulsion variations of the positive material. The change of exposure or color balance should be made in a sufficiently short time so as not to be perceptible in the projected picture. An additive system of color exposure requires three simultaneous exposures, red, green, and blue, whose intensities are controlled individually and preferably independently.

In the November 1952 issue of the Journal of the SMPTE, vol. 59, there is disclosed a fast acting exposure control system for color motion-picture printers invented by me which meets the above requirements as to an illumination system for color printers. In this article an illumination system for color printing using an additive system of color exposure is described as a projection type optical system in which light from a single lamp is divided into three beams which are independently filtered, controlled in intensity, and projected onto the printer aperture. The intensities of the red, green, and blue components of the exposing light are measured continuously and photoelectrically and compared with reference voltages which are analogous to the desired intensities and which are controlled by a perforated tape according to the predetermined requirements of each scene to be printed. Any errors between measured intensities and desired intensities, i. e. between photocell outputs and reference voltages, are amplified and applied to reversible servomotors which rotate vanes in the respective beams until the correct intensities are established.

While the above-described illumination system operates satisfactorily, it is somewhat cumbersome and expensive because of the fact that since each of the three color beams is handled separately, it involves a duplication, and in some instances a triple use, of the same optical elements.

The primary object of the present invention is to provide an improved illumination system for color motion-picture printers which is more simple and less expensive than that of the above-noted prior art, but which is adapted for use with the same photoelectrical exposure control system as used in said prior art device.

A further object is to provide an illumination system for color motion-picture printers requiring an additive system of color exposure and while handling the three color beams with a single optical system, permits the ready adjustment of the intensity of each beam individually and independently.

A further object is to provide an illumination system of the type set forth which has a high optical efficiency so that sufficient light is available to operate printers at the top speeds desired.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing, in which:

Fig. 2 is an enlarged detail view of that portion of the system shown in Fig. 1 which comprises the relay lens and dichroic mirrors and particularly showing how rotation of one or more of the mirrors effectively controls the color balance of the illuminating system.

Figure 1:
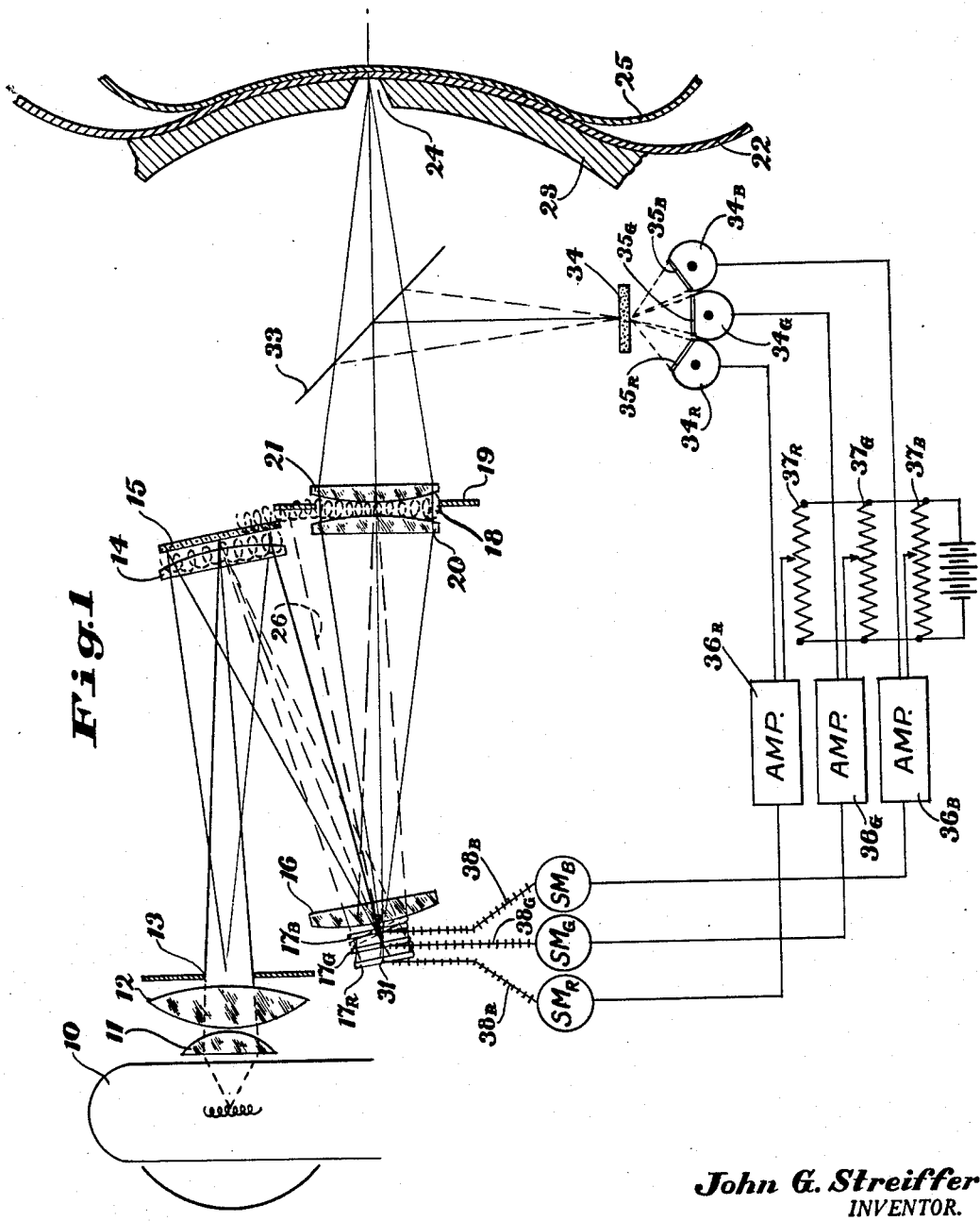
Fig. 1 is a schematic view of a projection type optical system for controlled additive trichromatic illumination using a single lamp and constructed in accordance with a preferred embodiment of the present invention.

Referring now to the drawings, wherein an illumination system constructed in accordance with a preferred embodiment of my invention is shown, light from an incandescent lamp 10 passes through condenser lenses 11 and 12 and through a rectangular aperture 13 which may be in the wall of the lamp house, not shown. Lenses 11 and 12 form an image of the lamp filament substantially in lens 14, in addition to acting as a condenser, so that together they can be aptly referred to as a condenser objective. A mirror 15 immediately behind lens 14 reflects light back through lens 14 and through a lens 16 onto a series of closely spaced mirrors 17R, 17G, 17B whose function and operation will be described later. Light reflected by mirrors 17R, 17G, 17B passes back through lens 16 and again forms an image of the lamp filament in a substantially square control aperture 18 formed in a masking plate 19 disposed between lenses 20 and 21, which lenses in turn produce an image of a plane in the vicinity of mirrors 17R, 17G, 17B in the plane of the negative film 22 which is moved in a known manner across a film gate 23 and past a printing aperture 24 in contact with a positive film 25 which is to be exposed.

Thus, images of the lamp filament are formed in the vicinity of lenses 14, 20 and 21, as indicated in dotted lines on the drawing, and images of the uniformly illuminated aperture 13 are formed in the vicinity of mirrors 17R, 17G, 17B and the printer aperture 24. With this arrangement, it is clear that the intensity of illumination at the printer aperture 24 depends upon the efficiency with which control aperture 18 is filled with an image of the lamp filament, or conversely, upon the size of the control aperture 18, provided it is smaller than the filament image. It will be appreciated that the lens 14 acts as a field lens in the optical system since its only function is to gather the light rays emanating from aperture 13. It need not be placed adjacent the mirror 15 but could be placed at a point removed from this mirror and between this mirror and lens 16 and still function as a field lens but probably with slightly less efficiency. The lenses 20 and 21 act as field lenses to gather the light passing to and from the control aperture 18 and to concentrate it in the printing aperture.

The success of this illumination system for use in color printing depends upon the unique choice and design of mirrors 17R, 17G, and 17B. Mirror 17B would be a dichroic mirror which reflects substantially all blue light and transmits all red and green light. Mirror 17G would similarly be a dichroic mirror which reflects substantially all green light and transmits all red light. Mirror 17R could be a metallic mirror to reflect the red light. This combination of reflections and transmissions have proven to be very desirable. It is clear, however, that other combinations could be used, depending upon the suitability of available mirrors. By this use of mirrors 17R, 17G, and 17B, a pencil of white light is broken up into red, green, and blue components and there are separate red, green, and blue images of the lamp filament formed in the control aperture 18. If the mirrors are individually properly oriented, the reflected light will pass through the lens 20 and through the control aperture 18. However, if one or more of the mirrors is rotated slightly, as shown in broken lines for mirror 17B in Figs. 1 and 2, light from this mirror will be reflected back along a line such as 26 and will not pass through the control aperture 18. It will be understood that by altering the degree of rotation of each of these mirrors, the amount of each of the three color components passing through the control aperture to the printer aperture can be readily adjusted. Accordingly, individual rotation of the mirrors 17R, 17G and 17B, through a relatively few degrees, would control the red, green, and blue exposures respectively. The mirrors 17R, 17G and 17B can be mounted in any number of ways so as to pivot on independent axes at right angles to the optic axis of the illuminating system, and by way of illustrating one, I have shown in Fig. 2 the mirror 17R carried by a clip 30 fixed to the end of a shaft 31. As a means of oscillating the shaft 31 by a servomotor, as will be later described, the shaft could have a pinion 32 fixed thereto. For purposes of clarity, I have shown the pivotal mounting for only one mirror 17R, but it is to be understood that each of the other mirrors 17G and 17B will have a similar and individual mounting. In Fig. 2 the pivotal axis of mirror 17G is indicated at 31' and that of mirror 17B at 31".

Since by the folded nature of the optical system, the mirrors only have to rotate a few degrees to go from maximum to minimum exposure, the mirrors can be placed very close to the plane of the image of aperture 13 formed by lens 14, thereby substantially eliminating displacement of the image in the printer aperture because of rotation of one or more of the mirrors 17R, 17G or 17B. Although the lens 16 is only half of a relay lens, the fact that the light is reflected back through it by the mirrors 17R, 17G and 17B, it acts as two lenses and produces the desired relay effect. If the lenses 14 and 20 are placed at the focal distance of the relay lens 16, or at the same distance therefrom, and in which case the lens 16 will relay the filament image at a 1:1 magnification, then the light passing between lens 16 and mirrors 17R, 17G and 17B will be collimated, and the filament images reflected from each of these mirrors will be focused in the control aperture 18 regardless of their relative spacing behind the lens 16. This feature is advantageous when it comes to placing the mirrors far enough apart in order to allow for individual rotation thereof.

The folded nature of the optical system has the further advantage that the optical axis makes an angle of only 15 to 20 degrees with the normal to the plane of the dichroic mirrors. The reflectivity-transmissivity curve of dichroic mirrors is adversely affected if the angle of incidence becomes large.

The angular position of mirrors 17R, 17G and 17B could be controlled by a servo system similar to that described in the above-noted SMPTE publication in order to give the desired automatic exposure and color balance control. Inasmuch as such a servo system is not a part of the present invention, I will describe the combination of the present illuminating system with such a servo system only briefly and in sufficient detail to show the adaptability of the present illumination system for use with such a control. Referring to Fig. 1, a beam splitting mirror 33 would reflect a few percent of the light leaving control aperture 18 onto a light diffuser 34 beyond which three photocells 34R, 34G and 34B are disposed, each with a color filter 35R or 35G or 35B in covering relation therewith to make the cells sensitive only to red, green or blue light, respectively. Voltages developed across photocell resistors in amplifiers 36R, 36G and 36B would be matched against reference voltages established by potentiometers 37R, 37G, 37B or other suitable devices, as described in the above SMPTE publication. The difference, or error voltage, would be amplified and used to control servomotors SMR, SMG, SMB, respectively, until the proper exposure was obtained. The drive between each of the servomotors and the mirrors 17R, 17G, 17B could be of any desired nature and in the present instance would include the pinion 32 on the mirror shafts 31, and hence I have indicated such drives schematically in Fig. 1 by crossed lines 38R, 38G and 38B.

The light rays in Fig. 2 are shown as being reflected from the first surface of each of mirrors 17R, 17G and 17B. In some cases it may be more desirable to put the dichroic coating on the rear surface of one or more of the mirrors. Also it may be desirable to use colored glass for the mirrors instead of clear glass in order to obtain more favorable spectral characteristics in the reflected light. For example, the dichroic mirror 17B (front surface) could be coated on an amber glass of transmission similar to that of a Wratten 15 filter. This would provide the short wavelength cutoff on a narrow band of green light transmitted by mirror 17B and reflected by 17G. The dichroic reflectivity characteristics of 17G would provide the long wavelength cutoff on this spectral band of green light. Similarly, mirror 17G might be coated on red glass similar in transmission to a Wratten 29 or 70 color filter so that only a preferred band of red light is reflected by 17R. It is obvious that the reflectivities of the mirrors could be arranged in other sequences, depending upon the spectral reflectivity and absorption characteristics which are realizable and most favorable.

It is pointed out that the field lens 14 and mirror 15 could be eliminated from this illumination system by placing the light source in their position and directing the light therefrom directly onto lens 16 without destroying the functional characteristics of the system. However, if the system were so modified, the optical efficiency would be drastically reduced inasmuch as less light would be gathered and put into the system and the system would, therefore, not be capable of use with printers requiring the high-speed exposures required in the commercial motion-picture field..

While I have shown and described certain specific embodiments of my invention, I am aware that many modifications thereof are possible. My invention, therefore, is not intended to be limited to the precise details of construction shown and described but is intended to cover all modifications coming within the scope of the appended claims.

Having thus described my invention, what I claim as new and desire to secure by Letters Patent of the United States is:

1. An illumination system for a photographic printer provided with a printing aperture and comprising in combination a lamp for emitting "white" light; a condenser objective for forming an enlarged image of the lamp filament; masking means providing a control aperture; optical means forming an optical system for relaying said filament image into said control aperture and including three mirrors disposed one behind the other, the first two of said mirrors being dichroic and adapted to reflect different ones of the three primary color components of "white" light, whereby the relayed filament image is broken up into three images, one of each primary color; means for pivotally mounting each of said mirrors to oscillate on an axis perpendicular to the optic axis of said system whereby the filament images reflected thereby can be moved into and out of said control aperture; and a field lens substantially at said control aperture to produce an image of a plane in the vicinity of said mirrors in the plane of the printing aperture and to direct the light from said control aperture into said printing aperture.

2. An illumination system according to claim 1 characterized by the fact that the mirrors of said relay optical system are adjacent the condenser objective and the filament image formed by said condenser objective as well as the light therefrom is reflected back into said relay system by a field lens and mirror combination located substantially at said filament image formed by said condenser objective, whereby only a slight rotation of said mirror is required to move the filament image reflected thereby into and out of the control aperture.

3. An illumination system according to claim 1 characterized by the fact that the mirrors of said relay optical system are adjacent to the condenser objective, and a field lens and mirror are located substantially at said filament image formed by said condenser to direct the image and the light from said condenser into said relay system, said field lens and mirror combination and relay optical means relatively disposed so that their optical axis makes an angle of less than 20° with the normal to the plane of the relay system whereby the reflectivity-transmissivity curve of the dichroic mirrors is not adversely affected.

4. An illumination system for a photographic printer provided with a printing aperture and comprising in combination an incandescent lamp; a condenser objective for forming an enlarged real image of the lamp filament; masking means providing a control aperture; a field lens and mirror combination located substantially at said enlarged image for directing it back toward said condenser objective but at an angle to the optic axis thereof; optical means for relaying said filament image into said control aperture and including a half relay lens packed up by three normally parallel mirrors, the first two of which are dichroic in nature and adapted to reflect certain ones of the three primary color components while transmitting certain others; the optical distance between said field lens and said relay lens and between the relay lens and said control aperture being equal so that said relayed image is relayed at a 1:1 magnification, whereby the light passing between the relay lens and the mirrors is collimated and the spacing between the different mirrors of the relay system has no effect on the focus of the relayed image in said control aperture; means for pivotally mounting each of said mirrors of the relay system to turn on an axis perpendicular to the optic axis of the system, whereby the filament image reflected thereby can be moved into and out of said control aperture; and a field lens substantially at said control aperture to form an image of the said three mirrors in said printing aperture and to direct the light from said control aperture into said printing aperture.

No references cited.